Oct. 20, 1964  K. G. MOSES  3,153,769
ELECTRICAL TEMPERATURE INDICATOR
Filed Feb. 14, 1962
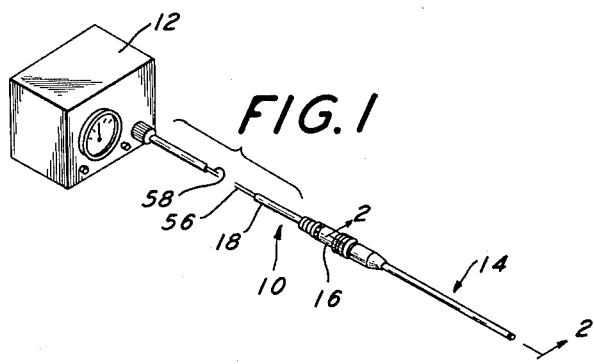
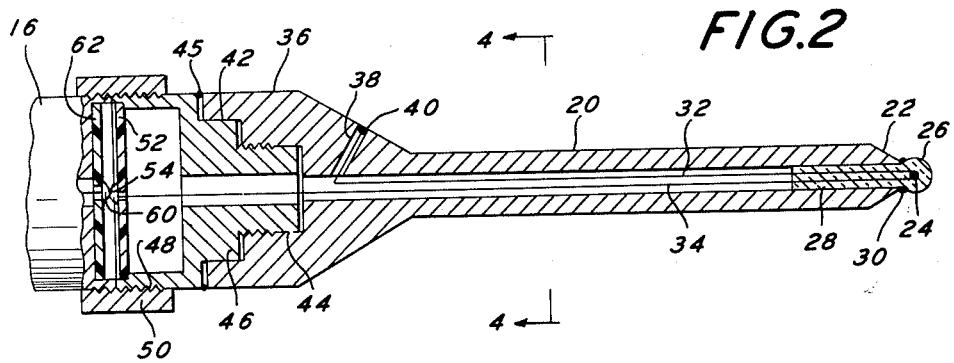
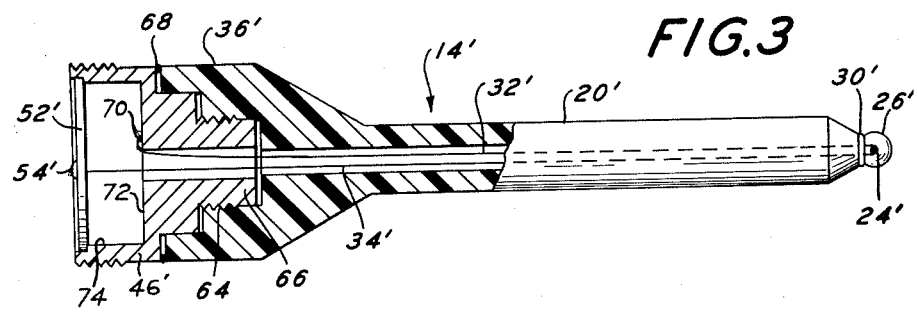
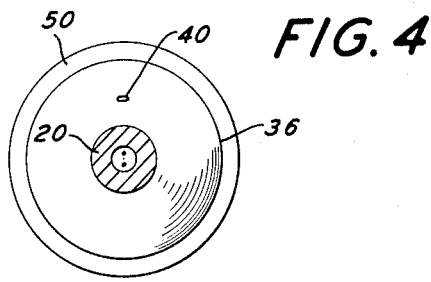
INVENTOR.
KENNETH G. MOSES
BY
Arthur H. Seidel
ATTORNEY

United States Patent Office 3,153,769
Patented Oct. 20, 1964

3,153,769
ELECTRICAL TEMPERATURE INDICATOR
Kenneth G. Moses, Philadelphia, Pa., assignor to Electro-Diagnostics, Inc., Philadelphia, Pa., a corporation of Pennsylvania
Filed Feb. 14, 1962, Ser. No. 173,307
6 Claims. (Cl. 338—28)

This invention relates to a temperature indicating device, and more particularly, to a thermal-electric temperature sensitive probe.

Thermal-electric temperature sensitive probes have been proposed heretofore. It is generally recognized that the probes proposed heretofore result in a noticeable time lag between detection of temperature changes and recording of the same. A substantial amount of work has been done in an effort to increase the sensitivity of the probe. The probe of the present invention overcomes the insensitivity of the probes proposed heretofore by providing a thermally responsive element at a free end thereof so as to attain maximum sensitivity.

The probes proposed heretofore suffer from a disadvantage in that they are not capable of being sterilized in a boiling solution. The probe of the present invention is readily detachable from an electrical conduit and is completely waterproof and made from materials which may be readily disposed in a boiling solution for sterilization thereof.

The probe of the present invention is substantially simpler than those proposed heretofore, is composed of a minimum number of parts, may be sterilized, and provides for substantially instantaneous recording of temperature changes. A preferred thermally sensitive resistance element is a thermistor. Thermistors are extremely sensitive to minute changes in temperature and may be incorporated in a probe in a manner so that the probe can absorb a substantial amount of shock without causing damage thereto.

In one embodiment of the present invention, the thermally-sensitive resistance element is supported at an open end of a metal tube. In another embodiment of the present invention, the resistance element is supported at an open end of a non-metallic tube. The non-metallic tube is preferably made from a self-lubricating synthetic resin having a very high softening temperature, is rigid, and has a very low coefficient of thermal conductivity. The low coefficient of thermal conductivity of the tube enhances the sensitivity of the probe.

It is an object of the present invention to provide a novel temperature indicating device.

It is another object of the present invention to provide a novel probe having a thermally-sensitive resistance element supported at one end thereof for maximum sensitivity.

It is another object of the present invention to provide a probe which includes a resistance element supported at one end of a tube having a low coefficient of thermal conductivity thereby increasing the sensitivity of the probe.

It is another object of the present invention to provide a simple probe capable of being sterilized in a boiling solution.

Other objects will appear hereinafter.

For the purpose of illustrating the invention there is shown in the drawings forms which are presently preferred; it being understood, however, that this invention is not limited to the precise arrangements and instrumentalities shown.

FIGURE 1 is a perspective view of the temperature indicating device of the present invention.

FIGURE 2 is a sectional view taken along the lines 2—2 in FIGURE 1.

FIGURE 3 is a partial longitudinal sectional view of another embodiment of the present invention.

FIGURE 4 is a sectional view taken along the lines 4—4 in FIGURE 2.

Referring to the drawing in detail, wherein like numerals indicate like elements, there is shown in FIGURE 1 a temperature indicating device designated generally as 10.

The device 10 includes an indicator 12 and a probe 14 connected thereto by means of a coupling joint member 16 and an electrical cable 18. The electrical cable 18 terminates in a jack which may be inserted into a suitable terminal connecting member on the indicator 12. The indicator 12 is adapted to contain a bridge circuit in the usual manner. The indicator 12 is provided with a dial calibrated directly into degrees of temperature. It is within the scope of the present invention to couple a permanent recorder to the indicator 12 if a permanent record is desired.

As shown more clearly in FIGURE 2, the probe 14 comprises an elongated hollow metal tube 20. The tube 20 has a free open end 22 which is tapered radially inwardly. A thermistor device is supported by the end 22 and projects therebeyond. The thermistor device includes a thermistor element 24 encased within a glass envelope 26. Preferably, the glass envelope 26 is substantially spherical. The glass envelope 26 is provided with a mounting stem which is telescopically disposed within the bore of the tube 20.

The glass envelope 26 is hermetically sealed to the end face of the tube 20 by means of an adhesive 30. Preferably, the adhesive 30 is a waterproof fast drying adhesive such as an epoxy resin. Electrical wires 32 and 34 are connected to the thermistor element 24 and extend therefrom through the stem 28 into the tube 20.

The end of tube 20 remote from end 22 is integral with an enlarged diameter base 36. A bore 38 extends from the periphery of a tapered portion of the base 36 to the central bore thereof. Wire 32 is drawn through the bore 38 and metallurgically joined to the base 36 by means of solder 40. For purposes of illustration, the wire 32 is indicated as making a sharp bend at the intersection of the central bore and bore 38. In practice, the wire 32 will be drawn very close to the inner peripheral surface defining the central bore of the tube 20 and base 36.

The base 36 is provided with bores 42 and 44 which are concentric with each other and the bore of the hollow tube 20. Bore 42 is larger than bore 44 and acts as a guide for fitting 46. The fitting 46 is provided with a reduced diameter portion which is threadedly engaged with threads in bore 44. The outer periphery of fitting 46 is substantially coextensive with the outer periphery of base 36. Threads 48 are provided on the outer periphery of fitting 46. A collar 50 releasably connects the fitting 46 to the coupling joint member 16. In this regard, the collar 50 has internal threads meshingly engaged with the external threads on each of the fitting 46 and the joint member 16.

The free end of the fitting 46 is provided with an enlarged chamber. An insulation disc 52 is secured in said last mentioned chamber and supports a central contact 54. The wire 34 has one end connected to the thermistor element 24 and its other end connected to the contact 54. Adhesive 45, such as an epoxy resin, seals the joint between the base 36 and fitting 46.

As shown more clearly in FIGURE 1, cable 18 includes electrical wires 56 and 58. Wire 56 is coupled to the joint member 16. Wire 58 is connected to contact 60. Contact 60 is supported by the joint member 16 and is electrically insulated therefrom by means of insulation 62. The contacts 54 and 60 are adapted to be in abutting contact in the assembled disposition of the joint member 16 and probe 14 as illustrated in FIGURE 2.

In assembling the probe 14, the stem 28 of the envelope 26 and the wires 32 and 34 are inserted into the tube 20. The length of the wires 32 and 34 at this point are longer than the length of the probe 14. Adhesive 30 is applied to fixedly secure the envelope 26 to the end of the tube 20. Wire 32 is fed back through the base 36 and bore 38. The wire 32 is then metallurgically joined to the base 36. The free end of the wire 32 is cut off.

Then the fitting 46 is threadedly engaged with the bore 44 with the wire 34 extending therethrough. The insulation 52 is applied and the wire 34 is then metallurgically joined to the contact 54. Thereafter, the base 36 is rotated with respect to the fitting 46 to back off at least one thread thereby tensioning the wire 34. After the wire 34 has been tensioned, adhesive 45 is applied to seal the joint between the base 36 and fitting 46 to prevent entry of foreign matter.

In operation, the probe 14 is coupled to the joint member 16 by means of collar 50. The small diameter of the tube 20 enables the probe 14 to be utilized for any one of a wide variety of temperature measuring devices. For example, the probe 14 may be utilized as a rectal thermometer. The disposition of the thermistor device on the end of the tube 20 enables the probe 14 to provide a most instantaneous temperature response. Due to the use of a thermistor as the thermally responsive element, the probe of the present invention may be utilized to detect very minute changes in temperature. While wire 34 is directly coupled to wire 58 by means of contacts 54 and 60, wire 32 is directly coupled to the base 36. The base 36 is directly coupled to the fitting 46 which in turn is coupled to the coupling joint member 16. The coupling member 16 is directly coupled to the wire 56.

Since all joints of the probe 14 are hermetically sealed, the probe 14 may be sterilized after each use. Since the probe 14 is rigidly constructed of metal, it may absorb abuse at any point except for the envelope 26. If the probe 14 is dropped, no damage will occur unless the probe lands directly on the envelope 26. While the envelope 26 has been described above as being a glass envelope, it will be appreciated by those skilled in the art that other equivalent electrically non-conductive materials may be substituted therefor. After a reading has been taken, and it is desired to substitute a new probe, the old probe is readily disconnected by unthreading the fitting 46 with respect to the coller 50. Hence, the device of the present invention includes a probe which may be rapidly changed when a plurality of readings are to be taken with a new probe being utilized for each reading.

In FIGURE 3, there is disclosed another embodiment of the probe designated generally as 14'. The probe 14' is identical with the probe 14 except as will be made clear hereinafter. The probe 14' includes a plastic base 36' and tube 20' which is comparable to the metal base 36 and tube 20 of probe 14. In probe 14', the bore 38 has been eliminated.

The tube 20' and its base 36' are preferably made from a rigid, electrically non-conductive plastic material. The tube 20' must be made from a rigid material if it is to be able to perform its intended function. Since the tube 20' is made from a non-conductive material, the tube 20' will not absorb or conduct heat away from the thermistor element 24'. Hence, the probe 14' will be more sensitive than the probe 14.

The probe 14' should not be made of glass since glass lacks the necessary strength characteristics. That is, glass will easily shatter or break. Preferably, the tube 20' is made from a synthetic plastic resin having a high softening temperature and self-lubricating characteristics such as nylon 7, Teflon, Kel-F, etc. Nylon 7 is a polymer of ethyl aminoheptanoate. Teflon is a polymer of tetrafluoroethylene. Kel-F is a monochlorofluoroethylene polymer. Each of these materials has a softening temperature of 400° F. or more. A softening temperature is a temperature below which the material exhibits dimensional stability.

The free end of the base 36' is provided with internal threads 64 in a central enlarged bore. The threads 64 are adapted to be in mating engagement with external threads on a reduced diameter portion 66 on the fitting 46'. Adhesive 68 is applied to the joint between the end of the base 36' and fitting 46' so that foreign matter or foreign liquids may not enter the interior of the probe 14'. Due to the high softening temperature of the tube 20', the probe 14' may be sterilized by use of conventional equipment.

Wire 32' is electrically coupled to the fitting 46' by solder 70 on shoulder 72 formed by bore 74 in fitting 46'. When wire 32' has been electrically coupled to fitting 46'. When wire 32' has been electrically coupled to fitting 46' and wire 34' has been coupled to contact 54' supported by and insulating disc 52', the base 36' will be backed off about one thread and the adhesive 68 will be applied.

The present invention may be embodied in other specific forms without departing from the spirit or essential attributes thereof and, accordingly, reference should be made to the appended claims, rather than to the foregoing specifications as indicating the scope of the invention.

I claim:

1. A thermal-electric temperature sensitive probe comprising a tube open at first and second ends, a thermistor device supported by said first end and projecting therebeyond, first and second wires connected to said device, a base means, said first wire extending through said tube to a first electrical contact surface on said base means, means electrically coupling said second wire to a second contact surface on said base means, said contact surfaces being electrically insulated from each other, a seal between said thermistor device and said first end of said tube for preventing foreign matter from entering said tube, said base means including a base connected to said tube, said base supporting a centrally disposed hollow fitting containing said first contact surface, a threaded joint between said base and said fitting, said threaded joint enabling the tensioning of said first wire to be selectively adjusted, and a seal at said joint to prevent foreign matter from passing through said joint.

2. A thermal-electric temperature sensitive probe comprising a tube open at first and second ends, a thermistor device supported by said first end and projecting therebeyond, first and second wires connected to said device, a base means, said first wire extending through said tube to a first electrical contact surface on said base means, means electrically coupling said second wire to a second contact surface on said base means, said contact surfaces being electrically insulated from each other, a seal between said thermistor device and said first end of said tube for preventing foreign matter from entering said tube, said base means including a base made from a metal having good electrical conductivity, and said second wire coupling means including a substantially radially outwardly directed bore into which said second wire extends.

3. A thermal-electric temperature sensitive probe comprising a tube open at first and second ends, a thermistor device supported by said first end and projecting therebeyond, first and second wires connected to said device, a base means, said first wire extending through said tube to a first electrical contact surface on said base means, means electrically coupling said second wire to a second contact surface on said base means, said contact surfaces being electrically insulated from each other, a seal between said thermistor device and said first end of said tube for preventing foreign matter from entering said tube, said tube being made from a self-lubricating and non-conductive plastic resin having a softening temperature substantially higher than the boiling point of water.

4. A probe in accordance with claim 3 wherein said tube is made from Teflon.

5. A thermal-electric temperature sensitive probe comprising a tube open at first and second ends, a thermistor device supported by said first end and projecting therebeyond, first and second wires connected to said device, a base means, said first wire extending through said tube to a first electrical contact surface on said base means, means electrically coupling said second wire to a second contact surface on said base means, said contact surfaces being electrically insulated from each other, a seal between said thermistor device and said first end of said tube for preventing foreign matter from entering tube, said tube being made from a self-lubricating and non-conductive plastic resin, the second end of said tube being integral with a plastic hollow base, a fitting threadedly engaged in said base, said fitting and base being part of said base means, a seal preventing entry of foreign matter into said tube through the joint between said fitting and said base, and the threaded joint between said base and said fitting enabling the tension of said first wire to be selectively adjusted.

6. In a probe comprising a tube having an open end, a thermistor element, a generally spherical glass envelope encasing said element, said envelope extending beyond said end of said tube, a hermetic seal between said envelope and said end of said tube, a pair of wires extending from said element into said tube for connection to an electrical measuring circuit, said envelope having a solid stem encasing an end portion of said wires adjacent said element, and said stem being telescopically disposed in said end of said tube.

References Cited in the file of this patent

UNITED STATES PATENTS

| | | |
|---|---|---|
| 845,413 | Haagn | Feb. 26, 1907 |
| 2,476,099 | Knudsen | July 12, 1949 |
| 2,753,247 | Greanias et al. | July 3, 1956 |
| 2,799,758 | Hutchins | July 16, 1957 |
| 2,838,935 | Cecio et al. | June 17, 1958 |